UNITED STATES PATENT OFFICE 2,329,074

DEVITALIZING COMPOSITION OF MATTER

Paul Müller, Neu-Allschwil, near Basel, Switzerland, assignor to the firm J. R. Geigy A. G., Basel, Switzerland No Drawing. Application March 4, 1941, Serial No. 381,763. In Switzerland March 7, 1940

6 Claims. (Cl. 167—22)

For combatting insects of all kind such as flies, stinging flies, moths, beetles, plant-lice and so on, there are mostly used petroleum solutions of pyrethrine or rotenone or aqueous emulsions of such compounds. Nicotine is, in spite of its poisonous character, also used for the protection of plants, but it cannot be used in inhabited rooms.

Both the first mentioned agents show the disadvantage of smelling disagreeably in spite of the admixture of strong perfuming agent, when they are used in form of petroleum solutions. In aqueous emulsions they are however stable only for a short time, as their activity already strongly decreases after a short time.

All experiments for inventing artificial substances acting very rapidly and positively, but being nearly or completely odorless and having no irritating effect upon human beings have given until now no essential result. Thus for example the use of halogenated nitriles, especially of trichloracetonitrile, is limited to uninhabited buildings or to closed receptacles, as these halogenated compounds, even when extremely diluted, irritate very strongly the mucous eye-membrane.

Therefore, it is very surprising that the condensation products of 1 molecule of chloral or bromal with 2 molecules of compounds with replaceable hydrogen from the aliphatic, araliphatic and benzene series, show, beside the sure killing effect on insects, only a very weak and not at all a disagreeable odor and do not exert even in finely dispersed form any irritating effect on the mucous membranes of the eyes, nose or throat.

The said compounds correspond to the following general formula

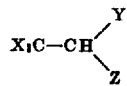

wherein X represents chlorine or bromine atoms and Y and Z mean aliphatic, araliphatic and aromatic radicals of the benzene series.

The said compounds can be used as powder or, when dissolved or emulsified, in solvents or diluents, but they can also be used together with other inert substances inactive by themselves or in combination with fungicide, bactericide or insecticide agents.

They are, apart from a few exceptions, very stable in neutral as well as in acid or weakly alkaline solutions and their preparation is technically very simple.

The preparation of the claimed compounds is known in many cases, and where this is not so it will be described in detail in some of the following examples.

The following examples illustrate the present invention. The parts are by weight, unless otherwise stated.

EXAMPLE 1

By treating, while strongly stirring, a mixture of 2 molecules of benzene or chlorobenzene with 1 molecule of chloral or chloralhydrate with an excess of concentrated sulfuric acid (of 100 per cent strength) heating takes place after same time, which first increases up to about 60° C. and then slowly decreases again. Stirring is continued until the reaction mass has cooled down to room temperature and contains solid particles. Then it is poured into much water whereby the raw condensation product separates out in a solid form. It is well washed out and, after being recrystallised from alcohol, it is obtained in form of white, fine crystals which show a weakly fruit-odor. The formulae of these compounds are the following ones:

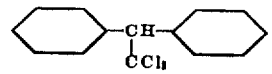

and

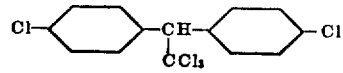

The first compound melts at 64° C., the second one at 103–105° C. (about the preparation see also O. Fischer, B. 7, 1191). These two diphenylmethane compounds react surely against flies, by spraying 5 ccm. of an alcoholic solution of 5 per cent strength per cubic metre of room. With bromal there are obtained compounds reacting in exactly the same manner. Death takes place, for flies, within 2 hours; already after 10–15 minutes nearly all flies are so paralyzed that they can no longer fly. Moths, plant-lice or other pests are also destroyed within a very short time by the sprayed compounds. Instead of solutions in alcohol, petroleum or similar solvents one may, in many cases, also use aqueous emulsions. Their efficiency does not thereby decrease even on long storage, which is the case for many known insecticide preparations. The compounds mentioned can also be used in a solid form, as they possess a sufficient volatility, but have only a weak and not at all disagreeable odor. They may, therefore, be used for the preparation of solid moth-proofing agents such as for example moth-balls, and, of course, also in combination with compounds already employed for the same purpose.

EXAMPLE 2

To a mixture of 60 parts of o-dichlorobenzene and 30 parts of chloral there are added drop by drop, while cooling with ice, 70 parts by volume of oleum (26 per cent of SC₃). The temperature should not rise over 20–30° C. The reaction mass is still stirred for a short time, until the temperature no longer rises after removing the cooling bath, whereupon it is poured into icewater. The crystals separated out are carefully washed out and, by recrystallizing from petroleum ether, obtained in form of white, fine little needles.

In exactly the same manner the corresponding compound is made from p-dichlorobenzene.

Nitrobenzene can also be caused to be reacted with chloral by using oleum (26 per cent of SO₃) as condensation agent.

All three condensation products in their usual concentration in an alcoholic solution have been proved suitable as devitalizing agents for insects. Bromal gives according to the same process products with very similar properties.

EXAMPLE 3

The condensation products from chloral and urea (in a proportion of 1:2) obtainable according to Coppin and Titherly (Chem. Soc. 105, 33 (1914)) are also solid and odorless very efficacious devitalizing agents, which can also be used in solid or liquid form, as indicated in Example 1.

EXAMPLE 4

By condensing 1 molecule of chloral, for example according to A. 173, 275 or according to B. 37, 1662, with 2 molecules of bases such as aniline, its homologues such as the 3 toluidines, xylidines and so on, their substitution products such as methyl aniline, o-chloraniline, 3:4-dichloraniline, benzylaniline and so on, or with other organic bases such as piperidine, pipecoline, benzylamine and so on, there are obtained solid reaction products of weak odor, which, when applied in an organic solution, also destroy flies and other pests after a short time.

EXAMPLE 5

The condensation product from 2 molecules of phenol and 1 molecule of chloralhydrate, as it is obtained according to Elbs (J. f. prakt. Chem. (2) 47, 60), possesses strong insecticide properties by spraying its solution in organic solvents. It forms white crystals of M. P. 202° C. Technical cresol or o-, m- or p-cresol, as well as the corresponding thiophenols produce similar compounds. By using bromal there are obtained very similar compounds.

EXAMPLE 6

When mercaptans, such as for example p-chlorobenzyl-mercaptan, are condensed with chloral by introducing hydrochloric acid gas at 50° C., one obtains well crystallized mercaptals of which the said mercaptal from the said mercapstan has a melting point of 81–82° C. and corresponds to the following formula

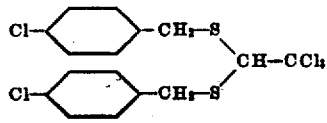

These mercaptals have also been proved suitable as effective insecticides, when their organic solution are sprayed round about.

EXAMPLE 7

2 molecules of toluenesulfamide may also be condensed, in the presence of concentrated sulfuric acid, with 1 molecule of chloral to a solid crystallized compound which melts at 115–116° C. and is easily soluble in alcohol. Instead of toluenesulfamide there may be used, of course, any other sulfamide such as p-chlorobenzenesulfamide or 3:4-dichlorobenzenesulfamide and so on. All of the condensation products possess, even in a weak concentration, insecticide properties.

According to the indications given in Example 1 there may also be used the following compounds:

1. *Chloroaldiurethane* (see B. 42, 4067)

Preparation.—6 g. of urethane are dissolved in 5 g. of chloral and 3–4 drops of concentrated sulfuric acid are added thereto. The reaction mixture becomes warmed up and solidifies. It is added to water, then the small crystals separated out are sucked off and well washed out. Finally they are recrystallized from acetone. M. P. 172° C.

Formula.—

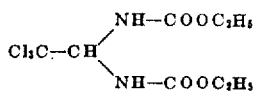

2. *Carbamic acid ester of chloralalcoholates*

Preparation.—46 g. of chloral ethylalcoholates are dissolved in ether with addition of 35 g. of dimethylaniline and converted into the chlorinated carbonic acid ester of the chloralethylalcoholate by introducing 23 g. of phosgene thereinto. The dimethylaniline hydrochloride separated out is filtered by suction and ammonia is introduced into the ethereal solution until saturation.

Formula.—

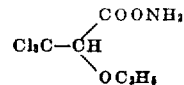

3. *Chloralformamide* (see Béhal Choay, Ann. de Chimie (6) 27, 320)

Preparation.—The product is obtained by heating chloral with formamide, in form of tabular crystals from glacial acetic acid, M. P. 216–217° C.

Formula.—

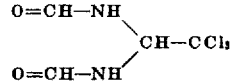

4. *Trimeric chloralimide* (see Pinner & Fuchs B. 10, 1068)

Preparation.—Chloralhydrate is heated with ammonium acetate until boiling, then the whole is poured into water. Chloralimide precipitates out in crystalline form.

Probable formula.—

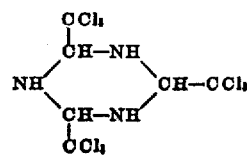

5. *Hexachlorodimethyltetroxane (see Pinner, B. 31, 1931, and B. 33, 1432)*

*Preparation.*—2 parts of chloralhydrate are dissolved in one part of formaldehyde of 40% content and 7 parts of concentrated sulfuric acid are added thereto, while well stirring, by portions of 20–50 g. Simultaneously the vessel is well cooled. There are formed two layers which are well stirred for 2 days. After this time a crystal paste has become formed which is poured into water. Then it is filtered by suction and well washed out with water. After drying it is extracted twice to three times with ether. The portion insoluble in ether is recrystallized from glacial acetic acid. Transparent prisms, M. P. 189° C. It is an excellent food poison for caterpillars and larvae of Colorado beetles.

*Formula.*—

$$Cl_3C-CH \begin{matrix} O-CH_2-O \\ O-CH_2-O \end{matrix} CH-CCl_3$$

6. *Dithienyltrichlorethane (see A. Peter, B. 17, 1341)*

*Preparation.*—10 g. of chloral and 23 g. of raw thiophene (mixture of 1 part of thiophene and 1 part of benzene) are dissolved in 200 ccm. of glacial acetic acid. To this mixture there is added, by a drop-funnel, the same volume of a mixture of equal parts of glacial acetic acid and of concentrated sulfuric acid. Then concentrated sulfuric acid is added until the thiophene reaction (isatine+sulfuric acid) becomes negative. During this addition cooling is effected with ice and water. When the reaction is completed, the reaction mass is poured into ice and water and extracted with petroleum ether. After evaporation of the solvent, one obtains the reaction product in form of beautiful crystals. M. P. 76° C.

*Formula.*—

$$\begin{matrix} CH-CH & & CH-CH \\ \| & C-CH-C & \| \\ CH-S & CCl_3 & S-CH \end{matrix}$$

7. *β,β,β-trichloro-4:4'-dihydroxy-2:2'-dimethyl-5:5'-diisopropyl-α,α-diphenylethane (see E. Jäger, B. 7, 1197)*

*Preparation.*—By dissolving in 1 molecule of chloral 2 molecules of thymol and adding by portions, and while stirring gradually, the four to five fold quantity of concentrated sulfuric acid, which is diluted by one third of its volume with glacial acetic acid, there is gradually separated out a white, resinous mass which, when introduced into water, soon becomes solid and granular.

The well washed product is boiled with water, if necessary by using superheated steam, until no more odour of thymol is perceivable, then recrystallised from alcohol, thus obtaining the compound in form of large monoclinic long needles crystallising with 1 molecule of alcohol.

*Formula.*—

[Structural formula: bis(2-hydroxy-3-methyl-6-isopropylphenyl)trichloromethylmethane]

8. *β,β,β-trichloro-4:4'-dihydroxy-3:3'-dicarboxy-α:α-diphenylethane (see Calvet & Metjuto, J. Chem. Soc. 1936, 554)*

*Preparation.*—10 g. of salicylic acid are dissolved in 100 ccm. of concentrated sulfuric acid, then shaken with 30 g. of chloralhydrate for 30 minutes and after 2 days poured into 800 ccm. of a mixture of ice and water. The viscous colorless mass separated out is washed out with much cold water, whereby it becomes microcrystalline.

*Formula.*—

[Structural formula: HO-C₆H₃(COOH)-CH(CCl₃)-C₆H₃(COOH)-OH]

What I claim is:

1. An insecticidal composition of matter comprising as essential active ingredient a compound of the formula $$X_3C-CH\begin{matrix}Y \\ Z\end{matrix}$$

wherein X represents a member of the group consisting of chlorine and bromine and Y and Z each represents a radical connected at a carbon atom to the CH group, said radical being selected from the group consisting of monovalent aliphatic, araliphatic and aromatic radicals of the benzene series, and a carrier therefor.

2. An insecticidal composition of matter comprising as essential active ingredient a compound of the formula $$Cl_3C-CH\begin{matrix}Y \\ Z\end{matrix}$$

wherein Y and Z each represents a radical connected at a carbon atom to the CH group, said radical being selected from the group consisting of monovalent aliphatic, araliphatic and aromatic radicals of the benzene series, and a carrier therefor.

3. An insecticidal composition of matter comprising as essential active ingredient a compound of the formula

[Structural formula: $Cl_3C-CH$ connected to two chlorinated phenyl groups with $Cl_n$]

wherein $n$ means 1 to 2, and a carrier therefor.

4. An insecticidal composition of matter comprising as essential active ingredient α,α-di(p-chlorophenyl)-β,β,β-trichlorethane of the formula $$Cl_3C-CH\begin{matrix}C_6H_4Cl \\ C_6H_4Cl\end{matrix}$$

and a carrier therefor.

5. A composition as set forth in claim 3, in which the carrier is a solvent.

6. A composition as set forth in claim 4, in which the carrier is a solvent.

PAUL MÜLLER.